United States Patent Office 3,651,002
Patented Mar. 21, 1972

3,651,002
ACRYLAMIDE TYPE SOIL STABILIZER CONTAINING EITHER SODIUM OR AMMONIUM ACRYLATE
Einosuke Higashimura and Eiichi Nakamura, Tokyo, Japan, assignors to Mitsubishi Rayon Co., Ltd., Tokyo, Japan
No Drawing. Filed Apr. 22, 1968, Ser. No. 723,302
Claims priority, application Japan, May 4, 1967, 42/28,367; Jan. 31, 1968, 43/5,392; Feb. 8, 1968, 43/7,416
Int. Cl. C08f *15/18, 15/22, 45/44, 45/46;* E02d *3/12*
U.S. Cl. 260—29.6 TA                                10 Claims

ABSTRACT OF THE DISCLOSURE

A novel acrylamide type soil stabilizer comprising (1) an acrylamide, (2) a water-soluble cross linking agent, (3) a member selected from the group consisting of sodium acrylate and ammonium acrylate in an amount of less than 10% based on the acrylamide, and (4) at least one member selected from the group consisting of sodium methacrylate, ammonium methacrylate, magnesium methacrylate and 2-hydroxyethyl methacrylate. This soil stabilizer provides a homogeneous aqueous solution which is stable even at a high concentration and has excellent soil stabilizing effect. The soil stabilizer is applied in the form of aqueous solution having a concentration of 2–20% together with a redox catalyst to soil to stabilize the same.

---

The present invention relates to an improved acrylamide type soil stabilizer.

It has been well known that the grouting process is effective as an engineering method for reinforcing weak foundation, preventing fluidic mud and damming up subterraneous leaking water in the general engineering and construction works as well as in the engineering works at underground mines. Various kinds of soil stabilizers have heretofore been developed for the purpose of using the same in the grouting process. However, acrylamide type soil stabilizers have been well known as those excellent in various efficiencies which are fundamentally required in the field of soil stabilization works, such as permeability into minute interstices of soil, rapid curability, strength and anti-water permeability of the stabilized soil thereby formed, or variations with the lapse of time in said strength and anti-water permeability.

Generally, these acrylamide type soil stabilizers consist of an acrylamide and a water-soluble divinyl compound. However, purification process for obtaining purified crystals of acrylamide requires much trouble, which becomes one of the causes for a relatively high cost of such acrylamide type soil stabilizer, compared with soil stabilizers of other types. Preparation of acrylamide type soil stabilizer using acrylamide not subjected to purification treatment of crystals thereof is not troublesome. However, occlusion thereinto of sodium acrylate or ammonium acrylate is inevitable when acrylamide to be used therein is prepared from acrylonitrile according to the conventional soda or ammonia neutralization method. Accordingly, the soil stabilized using such acrylamide type soil stabilizer containing acrylamide in which sodium acrylate or ammonium acrylate has been occluded is apt to be ruptured when contacted with water, whereby the desired strength of the stabilized soil cannot be obtained. This is because, copolymerization of the system does not proceed homogeneously, whereby homopolymer of sodium acrylate or ammonium acrylate is formed. Because the thus formed homopolymer is soluble in water, this homopolymer is eluded in contact with water contained in soil, thereby to weaken the whole of the soil treated with such acrylamide type soil stabilizer.

Furthermore, the soil stabilizer is usually used in the form of an aqueous solution. The dissolving operation of purified crystals of acrylamide is a troublesome job. Accordingly, it is very inconvenient to carry out this dissolving operation at the working ground such as narrow underground mine levels, underground tunnels and the like wherein a large amount of soil stabilizer is presently used for one working section owing to universal application of the grouting process. Particularly, the dissolving operation becomes very difficult in the winter season because of a decrease in solubility of acrylamide pure crystals due to the fall of temperature. In addition, crystals of acrylamide is poisonous. It is therefore undesirable from the viewpoint of sanitary welfare that the acrylamide crystals fly all over the working ground when they are dissolved in water on the spot. Accordingly, it is desirable that the acrylamide crystals are provided in the form of an aqueous solution from the beginning. However, an aqueous acrylamide solution of about 40% concentration reaches a state of saturation at 0° C. When a cross linking agent such as alkylidenebisacrylamide having low solubility coexists with the aqueous acrylamide solution, solubility of the whole decreases further to about 35%, and crystals are separated at a higher concentration than the above. It is therefore not possible to produce stably such a highly concentrated aqueous solution of acrylamide type soil stabilizer as can be economically payable even for transportation of the aqueous solution as such in a large quantity.

It is an object of the present invention to provide an acrylamide type soil stabilizer which has excellent soil stabilizing effect and is stable even in the form of a highly concentrated aqueous solution, and which can advantageously be produced.

The present invention is an acrylamide type soil stabilizer containing (1) an acrylamide, (2) a water-soluble cross linking agent, (3) less than 10% of sodium acrylate or ammonium acrylate based on the acrylamide, and (4) sodium methacrylate, ammonium methacrylate, magnesium methacrylate or 2-hydroxyethyl methacrylate, or an arbitrary mixture thereof, and capable of being prepared to obtain a homogeneous aqueous solution with 40% of concentration at 0° C.

The present soil stabilizer can be prepared to obtain a homogeneous aqueous solution which is very stable even with such a high concentration, including of course 35%, as high as 40% or above at 0° C., and is free from separation of crystals.

As the water-soluble cross linking agent used in the present invention, there may be mentioned, for example, methylenebisacrylamide, methylenebismethacrylamide, 1, 3 - di(acrylamidemethyl) - 2 - imidazolidone, 1,3 - (di-(methacrylamidemethyl) - 2-imidazolidone or hexahydro-1,3,5-triacryl-S-triazine. The use of these cross linking agents is not limited to one kind, but they are used in combination of two kinds or more. They are preferably used in an amount of 1–30% by weight based on the whole monomers. The sodium acrylate or ammonium acrylate used in the present invention may not be a hinderance to homogeneity of the polymerization unless its amount exceeds 10% by weight of the whole monomers. The coexistence of the monomers is rather desirable as long as the polymerization is effected homogeneously.

The sodium methacrylate, ammonium methacrylate, magnesium methacrylate or 2-hydroxyethyl methacrylate or a mixture thereof varies in amount depending upon the content of sodium acrylate or ammonium acrylate being present therewith. However, usually they are used respectively in an amount of 3–60%, preferably 3–35% by weight based on the whole monomers. These monomers have large effect in carrying out homogeneous polymerization of the present soil stabilizer and in improving its strength. The stabilized soil obtained by using the present soil stabilizer has excellent properties. Furthermore, an amount of the present soil stabilizer necessary for accomplishing the object can considerably be saved. This is largely ascribable to homogeneity of the polymerization. Another advantage of the present invention resides in the fact that when such acrylamide prepared by an acrylonitrile hydrolyzation-process is used as an acrylamide of the present invention, the reaction product liquid from which, if necessary, sodium sulfate or ammonium sulfate has been removed, can be used as such without necessitating separating acrylamide and purifying the same. In this case, because sodium acrylate or ammonium acrylate coexists inevitably therewith, the reaction product liquid, to which necessary amounts of sodium methacrylate, ammonium methacrylate, magnesium methacrylate or 2-hydroxyethyl methacrylate or a mixture thereof, and a water-soluble cross linking agent have been added, can be used as such as an aqueous solution of the present soil stabilizer. The acrylamide is usually used preferably in the range of from 10 to 96% by weight based on the monomers. It is possible to stably prepare a highly concentrated aqueous solution from the present soil stabilizer, and therefore transportation of the aqueous solution can advantageously be carried out.

The present soil stabilizer can sufficiently be used in accordance with well known method of use of common soil stabilizer. That is, if necessary, the present soil stabilizer is prepared to obtain a 2–20% by weight aqueous solution and the resultant aqueous solution together with a required amount of an appropriate redox catalyst is applied to soil by injection or spray. As the redox catalyst used, such as those being conventionally used may be sufficiently used, for example, such oxidizing agent as ammonium persulfate and potassium persulfate, such reducing agent as sodium thiosulfate, ferrous sulfate, dimethylaminopropionitrile and $\beta$-diketone. The amount of these redox catalysts to be used is suitably selected depending upon the conditions such as the desired curing time and the like, but usually they are used in an amount of 0.1–10% by weight based on the monomers.

By adding other various additives to the present soil stabilizer, it is possible to obtain a soil stabilizer from which a further highly concentrated aqueous solution can be prepared. For example, an acrylamide type soil stabilizer prepared by addition thereto of acrylonitrile or N-methylolacrylamide or a mixture thereof makes it possible to obtain such a stable highly concentrated aqueous solution as high as 50% or above. For instance, a 50 weight percent aqueous solution of the present soil stabilizer comprising 37.4 wt. parts of acrylamide, 6.6 wt. parts of 1,3-di(acrylamidemethyl)-2-imidazolidone, 2.2 wt. parts of sodium acrylate, 5.5 wt. parts of magnesium methacrylate, 6.6 wt. parts of 2-hydroxyethyl methacrylate and 6.6 wt. parts of N-methylolacrylamide does not separate at all the crystals at 0° C. for a period of 30 days or more. Even a 66.0 wt. percent concentrated aqueous solution of said soil stabilizer does not separate at all the crystals at 2° C.±1° C. for a period of one week or more. Furthermore, with addition thereto of 100 p.p.m. of iodine and 50 p.p.m. of cupferron (ammonium salt of N-nitroso phenylhydroxylamine) as polymerization inhibitors, the aqueous solution is stable at 50° C. for a period of 30 days or more.

Thus, the stability of a highly concentrated aqueous solution of the present stabilizer makes it possible to carry out more advantageously transportation of the present soil stabilizer in the form of an aqueous solution. For example, an aqueous solution having the total monomer concentration of about 50 to about 70% can be produced directly from the reaction product liquid from which acrylamide prepared by an acrylonitrile-hydrolyzation-process has not been separated and not purified, and if necessary, sodium sulfate or ammonium sulfate has been removed therefrom, by adding thereto acrylonitrile or N-methylolacrylamide or a mixture thereof, and other necessary components. Thus obtained aqueous solution as such can be transported to a working ground where the aqueous solution is used on the spot.

Furthermore, because an amount of acrylamide used can be reduced, for example, by the use of acrylonitrile added thereto, it becomes possible to replace a part of expensive acrylamide by the corresponding part of inexpensive acrylonitrile. This is a large merit from the practical point of view.

Still further, the present acrylamide type soil stabilizer to which a water-soluble polyol, water-soluble Cellosolve or acetonitrile has been added makes it possible to prepare a stable aqueous solution having such a high concentration as high as 50% or more, whereby transport of an aqueous solution of stabilizer can be carried out advantageously. As the effective water-soluble polyol in stabilizing a highly concentrated aqueous solution of the present soil stabilizer, there may be mentioned, for example, ethylene, glycol, propylene glycol, diethylene glycol, butanediol, polyethylene glycol, glycerine, trimethylolpropane, pentaerythritol, dextrose, soluble starch and the like. Furthermore, as the water-soluble Cellosolve, there may be mentioned, for example, methyl Cellosolve, ethyl Cellosolve, butyl Cellosolve, Cellosolve acetate and the like.

The polyol is preferably used in an amount of 0.1–10% by weight based on the total weight of the monomers. The Cellosolve is preferably used in an amount of 1–10% by weight based on the total weight of the monomers.

The acrylamide type soil stabilizer prepared by addition to the present soil stabilizer of acrylonitrile, N-methylolacrylamide or a mixture thereof, and a water-soluble polyol, water-soluble Cellosolve or acetonitrile or a mixture thereof is extremely stable even at a surprisingly highly concentrated aqueous solution, and it is possible to obtain therefrom an aqueous solution of the soil stabilizer having a concentration of 70% or more. For example, a soil stabilizer prepared from a mixture comprising 45.0 wt. parts of acrylamide, 9.0 wt. parts of 1,3-di(acrylamide-methyl)-2-imidazolidone, 2.0 wt. parts of sodium acrylate, 7.5 wt. parts of sodium methacrylate, 10.0 wt. parts of N-methylolacrylamide and 10.0 wt. parts of acrylonitrile, to which 2% by weight of ethylene glycol based on the weight of the mixture has been added, does not separate the crystals of acrylamide even in the form of a 84.5 wt. percent aqueous solution at 2° C.±1° C. for a period of one week or more. When 100 p.p.m. of iodine and 50 p.p.m. of cupferron are added thereto as polymerization inhibitors, no change is observed for a period of 30 days or more even at 50° C. while maintaining stability in the extreme.

Furthermore, the addition to the present soil stabilizer of N-methyl pyrrolidone, dimethyl sulfide, dimethyl sulfoxide, tetra-hydrothiophene-1,1-dioxide or an arbitrary mixture thereof is effective in stabilizing a highly concentrated aqueous solution of acrylamide type soil stabilizer, particularly of those in which acrylamide containing sodium sulfate has been used. The acrylamide prepared from acrylonitrile according to the soda neutralization process contain usually sodium sulfate as an impurity. This sodium sulfate is not only apt to separate by itself but also is liable to promote separation of crystals of other monomers. Accordingly, when 0.5 wt. percent or more of sodium sulfate is present in the soil stabilizer, it is preferable to add thereto the aforesaid N-methylpyrrolidone or a sulfur compound as a separation inhibitor of sodium sulfate. When such separation inhibitor of sodium sulfate, an amount thereof to be added varies depending upon the amount of sodium sulfate present in the soil stabilizer, but it is usually desirable to use such inhibitor in an amount of 1–20% by weight based on the whole monomers. Such additives do not degrade at all the practical efficiency of the soil stabilizer. It is of course possible to improve stability of a highly concentrated aqueous solution by adding to the present soil stabilizer a separation inhibitor of sodium sulfate and acrylonitrile and the like or a water-soluble polyol and the like. The acrylamide type soil stabilizer to which such various additives have been added can also be used according to usual method of use of soil stabilizers.

The present invention is illustrated with reference to the following examples, wherein all parts and percentages are by weight, respectively.

EXAMPLE 1

A 45% aqueous solution of a soil stabilizer comprising 4.5 parts of acrylamide, 0.15 part of sodium acrylate, 0.7 part of methylenebisacrylamide and 0.5 part of 2-hydroxyethyl methacrylate was prepared. The aqueous solution was allowed to stand at 0° C. for a period of 10 days or more. As a result, no separation of the crystals was observed therein, and the solution was found to be stable.

This aqueous solution was diluted with water to prepare a 5.9% aqueous solution, to which a redox catalyst comprising 0.5 part of ammonium persulfate and 0.5 of dimethyl aminoethanol was contained. 100 parts of the resultant mixed aqueous solution was mixed with 320 parts of Toyoura Standard Sand. The mixture was allowed to stand at room temperature (about 23° C.) in air, and as a result the mixture was cured in 2 minutes and 10 seconds to form a strong sand gel which had anti-water permeability and was non-soluble in water. After 2 hours, the uniaxial compression strength of the sand gel was 7.1 kg./cm.$^2$. After allowing said sand gel to stand in water for 20 days, the uniaxial compression strength was found to be 7.05 kg./cm.$^2$.

On the other hand, a 40% aqueous solution of a soil stabilizer comprising 4.5 parts of acrylamide and 0.7 part of methylenebisacrylamide did not become a homogeneous aqueous solution, wherein separation of the crystals was initiated at 0° C. Furthermore, with a 5.9% aqueous solution of this two-component type soil stabilizer, the same curing as above was carried out, and as a result, after 2 hours the uniaxial compression strength of the sand gel, thereby obtained was 4.0 kg./cm.$^2$.

EXAMPLES 2–18

With aqueous solutions of the soil stabilizers having the polymerization components as shown in Table 1, the same procedures as in Example 1 were carried out respectively to determine stability of the respective aqueous solutions and strength of the respective Toyoura Standard Sand gels.

Each sand gel thus obtained was strong, which had anti-water permeability and was non-soluble in water. Stability of the aqueous solution, time required for cure and uniaxial compression strength of the sand gel determined in each example was denoted in Table 1. In said table, "Polymerization inhibitor" implies "100 p.p.m. of iodine and 50 p.p.m. of cupferron." Furthermore, the amount of the aqueous solution of soil stabilizer used for curing the sand in each example is 100 parts.

TABLE 1

| Ex. No. | Composition of soil stabilizer (part) | Stability of aqueous solution of soil stabilizer | Concentration of aqueous solution used in curing (percent) | Redox catalyst (part) | Soil to be stabilized (part) | Curing temperature (° C.) | Time required for curing (min. and sec.) | Uniaxial compression strength after the lapse of 2 hours (kg./cm.$^2$) |
|---|---|---|---|---|---|---|---|---|
| 2 | AAm (8.0), DAI (1.4), NaA (0.3), NaMA (1.7) | 45% aqueous solution being kept at 0° C. remains as homogeneous solution for 10 days or more. | 11.4 | APS (0.5), DMAPN (0.5) | Toyoura Standard Sand (320). | 33 | 2'11'' | 11.0 |
| 3 | AAm (4.0), DMAI (1.8), NH₄A (0.1), MgMA (0.8) | do | 6.7 | APS (0.5), N,N,N',N'-tetramethylethylene diamine (0.5). | Toyoura Standard Sand (300). | 23 | 2'30'' | 8.3 |
| 4 | AAM (3.7), DAI (0.6), NaA (0.2), NaMA (0.6), MAAm (0.6) | 55% aqueous solution being kept at 0°–3° C. remains as a homogeneous solution for 7 days or more. When a polymerization inhibitor is added thereto, the solution remains stable at 50° C. for 30 days or more. | 5.7 | KPS (0.5), DMAPN (0.5) | ----do------ | 23 | 2'20'' | 6.0 |
| 5 | AAm (3.7), DAI (0.6), NaA (0.2), NaMA (0.6), Polyethylene glycol (0.5). | 56% aqueous solution being kept at 0°–3° C. remains as a homogeneous solution for 7 days or more. | 5.6 | APS (0.5), DMAPN (0.5) | ----do------ | 23 | 2'30'' | 5.7 |
| 6 | AAm (3.6), DAI (0.7), NaA (0.2), NH₄MA (0.5) | 40% aqueous solution being kept at 0° C. remains as a homogeneous solution for 10 days or more. | 5.0 | APS (0.5), DMAPN (0.6) | ----do------ | 20 | 2'20'' | 5.5 |
| 7 | AAM (3.5), DAI (0.6), NaA (0.1), MgMA (0.5), Butyl Cellosolve (0.1). | 50% aqueous solution containing a polymerization inhibitor being kept at 0° C. remains as a homogeneous solution for 30 days or more, and is stable even at 50° C. for 30 days or more. | 4.8 | APS (0.5), DMAPN (0.6) | ----do------ | 20 | 3'20'' | 6.2 |
| 8 | AAm (3.5), DAI (0.6), NaA (0.1), NaMa (0.5), Ethyl Cellosolve (0.1). | 50% aqueous solution containing a polymerization inhibitor being kept at −3° C. remains as a homogeneous solution, and is stable at 50° C. for 30 days or more. | 4.8 | APS (0.5), Dimethyl aminoethanol (0.6). | ----do------ | 20 | 2'40'' | 6.3 |
| 9 | AAm (3.8), DAI (0.9), NaA (0.2), NaMA (0.5), ATN (1.0) | 64% aqueous solution being kept at 0° C. remains as a homogeneous solution for 7 days or more. | 6.4 | APS (0.5), DMAPN (0.6) | ----do------ | 20 | 3'30'' | 6.6 |

See footnotes at end of table.

TABLE 1—Continued

| Ex. No. | Composition of soil stabilizer (part) | Stability of aqueous solution of soil stabilizer | Concentration of aqueous solution used in curing (percent) | Redox catalyst (part) | Soil to be stabilized (part) | Curing temperature (° C.) | Time required for curing (min. and sec.) | Uniaxial compression strength after the lapse of 2 hours (kg./cm.²) |
|---|---|---|---|---|---|---|---|---|
| 10 | AAm (4.0), DAI (0.9), NaA (0.2), NaMA (0.7), AN (1.0), MAAm (1.7), Cellosolve acetate (0.1). | 86.5% aqueous solution being kept at 2° C. remains as a homogeneous solution for 7 days or more, and is stable at 50° C. for 30 days or more. | 5.8 / 4.3 | Same as above / Same as above | do / do | 20 / 20 | 3′20″ / 4′00″ | 6.1 / 4.5 |
| 11 | AAm (4.0), DAI (0.6), NH₄A (0.2), MgMA (0.7), MAAm (1.7), AN (1.0), E.G. (0.2). | 90% aqueous solution containing a polymerization inhibitor, remains as a homogeneous solution at 2° C. for 7 days or more, and is stable at 50° C. for 30 days or more. | 5.6 / 4.2 | Same as above / Same as above | do / do | 23 / 23 | 3′30″ / 4′10″ | 6.2 / 4.5 |
| 12 | AAm (4.0), DAI (0.9), NaA (0.1), NaMA (0.5), Na₂SO₄ (0.13), MAAm (0.5), N-methyl pyrrolidone (0.2). | 63% aqueous solution being kept remains at 0° C. for 1 day or more, and when polymerization inhibitor is added thereto, the solution remains stable at 50° C. for 30 days or more. | 6.3 | KPS (0.5), DMAPN (0.6) | do | 23 | 2′20″ | 8.2 |
| 13 | AAm (3.5), MBAAm (0.6), NaA (0.1), NaMA (0.6), Na₂SO₄ (0.18), Dimethyl sulfide (0.2). | 52% aqueous solution is homogeneous at 0° C. for 20 days or more, and when a polymerization inhibitor is added thereto, the solution is stable at 50° C. for 30 days or more. | 5.2 | APS (0.5), N,N,N′,N′-tetramethylethylene diamine (0.4). | do | 23 | 2′10″ | 5.5 |
| 14 | AAm (3.6), DAI (0.6), NaA (0.2), MgMA (0.5), AN (0.5). | 55% aqueous solution is homogeneous at 0° C. for 10 days or more. | 5.4 | APS (0.5), DMAPN (0.6) | do | 20 | 4′00″ | 5.5 |
| 15 | AAm (4.0), DAI (0.9), NH₄A (0.1), NaMA (0.5), MAAm (0.5), AN (1.0), Na₂SO₄ (0.6), Dimethyl sulfoxide (0.05). | 71.1% aqueous solution is homogeneous at 0.° C. for 21 days or more, and when a polymerization inhibitor is added thereto, the solution is stable at 50° C. for 30 days or more. | 7.1 | KPS (0.5), DMAPN (0.6) | do | 20 | 3′45″ | 8.8 |
| 16 | AAm (3.5), MBAAm (0.6), NaA (0.1), NaMA (0.6), Na₂SO₄ (0.05), Sulforan (0.1). | 50% aqueous solution is homogeneous at 0° C. for 21 days or more and when a polymerization inhibitor is added thereto, the solution is stable at 50° C. for 30 days or more. | 5.0 | APS (0.5), N,N,N′,N-tetramethylene diamine (0.4). | do | 20 | 2′10″ | 5.5 |
| 17 | AAm (3.5), MBAAm (0.6), NaA (0.1), NaMA (0.6), Na₂SO₄ (0.1), N-methyl pyrrolidone (0.1). | 50% aqueous solution has the same stability as mentioned in Example 16. | 5.1 | Same as above | do | 20 | 2′00″ | 5.8 |
| 18 | AAm (4.2), DAI (1.0), NaA (0.1), MgMA (5.0), 2-HEMA (0.6). | 40% aqueous solution is homogeneous at 0° C. | 11.9 | APS (0.5), DMAPN (0.6) | do | 20 | 3′20″ | 7.9 |

NOTE.—Abbreviations denoted in Table 1 respectively represent the following:

AAm = Acrylamide.
DAI = 1,3-di(acrylamidemethyl)-2-imidazolidone.
DMAI = 1,3-di(methacrylamidemethyl)-2-imidazolidone.
MBAAm = Methylenebisacrylamide.
NaA = Sodium acrylate.
NH₄A = Ammonium acrylate.
NaMA = Sodium methacrylate.
NH₄MA = Ammonium methacrylate.
2-HEMA = 2-hydroxyethyl methacrylate.
AN = Acrylonitrile.
MAAm = N-methylolacrylamide.
ATN = Acetonitrile.
E.G. = Ethylene glycol.
APS = Ammonium persulfate.
KPS = Potassium persulfate.
DMAPN = Dimethylaminopropionitrile.

What is claimed is:

1. An aqueous type soil stabilizer which contains water and a resin-forming material comprising (1) an acrylamide, (2) a water-soluble cross linking agent, copolymerizable with said acrylamide, (3) at least one member in an amount of less then 10% by weight based on the acrylamide selected from the group consisting of sodium acrylate and ammonium acrylate, and (4) at least one member selected from the group consisting of sodium methacrylate, ammonium methacrylate, magnesium methacrylate and 2-hydroxyethyl methacrylate, and said resin-forming material is capable of providing a homogeneous aqueous solution with a concentration of at least 40% by weight at 0° C.

2. An acrylamide type soil stabilizer according to claim 1, wherein said soil stabilizer contains at least one member selected from the group consisting of acrylonitrile and N-methylolacrylamide and is capable of providing a homogeneous aqueous solution with a concentration of 50% by weight.

3. An acrylamide type soil stabilizer according to claim 1, wherein said soil stabilizer contains a water-soluble polyol and is capable of providing a homogeneous aqueous solution with a concentration of 50% by weight.

4. An acrylamide type soil stabilizer according to claim 1, wherein said soil stabilizer contains at least one member selected from the group consisting of a water-soluble Cellosolve and acetonitrile and is capable of providing a homogeneous aqueous solution with a concentration of 50% by weight.

5. An acrylamide type soil stabilizer according to claim 1, wherein said soil stabilizer contains at least one member selected from the group consisting of acrylonitrile and N-methylolacrylamide, and a water-soluble polyol.

6. An acrylamide type soil stabilizer according to claim 1, wherein said soil stabilizer contains at least one member selected from the group consisting of acrylonitrile and N-methylolacrylamide, and at least one member selected from the group consisting of a water soluble Cellosolve and acetonitrile.

7. An acrylamide type soil stabilizer according to claim 1, wherein said soil stabilizer contains at least one member selected from the group consisting of N-methylpyrrolidone, dimethyl sulfide, dimethyl sulfoxide and tetra-hydrothiophene-1,1-dioxide.

8. An acrylamide type soil stabilizer according to claim 1, wherein said soil stabilizer contains at least one member selected from the group consisting of acrylonitrile, N-methylolacrylamide, water-soluble polyol, water soluble Cellosolve and acetonitrile, and at least one member selected from the group consisting of N-methylpyrrolidone, dimethyl sulfide, dimethyl sulfoxide and tetra-hydrothiophene-1,1-dioxide.

9. An acrylamide type soil stabilizer according to claim 1, wherein the acrylamide prepared from acrylonitrile according to a method selected from the soda neutralization method and ammonia neutralization method is used without separating and purifying said acrylamide.

10. An acrylamide type soil stabilizer which comprises (1) an acrylamide of at least 10% by weight, (2) a water-soluble cross linking agent of 1–30% by weight, (3) at least one member of less than 10% by weight based on the acrylamide selected from the group consisting of sodium acrylate and ammonium acrylate, and (4) at least one one member of 3–60% by weight selected from the group consisting of sodium methacrylate, ammonium methacrylate, magnesium methacrylate and 2-hydroxyethyl methacrylate, and is capable of providing a homogeneous aqueous solution with a concentration of 40% by weight.

References Cited

UNITED STATES PATENTS

| | | | |
|---|---|---|---|
| 2,801,984 | 8/1957 | Morgan et al. | 252—8.5 LC X |
| 3,178,385 | 4/1965 | Dinges et al. | 260—29.6 HW X |
| 3,234,158 | 2/1966 | Pfluger et al. | 260—29.6 UX |
| 3,323,603 | 6/1967 | Lummus et al. | 175—65 |
| 3,324,068 | 6/1967 | Michaels | 260—29.6 Z UX |
| 3,338,320 | 8/1967 | Gilson et al. | 175—65 |
| 3,377,249 | 4/1968 | Marco | 260—29.6 H UX |
| 3,450,680 | 6/1969 | Jursich et al. | 260—29.6 Z UX |
| 3,210,310 | 10/1965 | Holbert et al. | 260—29.6 H UX |
| 3,306,870 | 2/1967 | Eilers et al. | 260—29.6 HN |
| 3,324,017 | 6/1967 | Perry et al. | 260—29.6 HN X |
| 3,412,060 | 11/1968 | Sarem | 260—29.6 H |
| 3,445,441 | 5/1969 | Rushton | 260—29.6 HN X |

PHILIP E. ANDERSON, Primary Examiner

U.S. Cl. X.R.

61—36 R; 260—29.6 E, 29.6 HN, 29.6 N, 29.6 Z